United States Patent
Xin et al.

(10) Patent No.: US 9,323,367 B2
(45) Date of Patent: Apr. 26, 2016

(54) AUTOMATIC ANNOTATION DE-EMPHASIS

(71) Applicant: SMART Technologies ULC, Calgary (CA)

(72) Inventors: Min Xin, Calgary (CA); Andrew Leung, Calgary (CA); Michael Boyle, Calgary (CA); Edward Tse, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 16 days.

(21) Appl. No.: 13/923,866

(22) Filed: Jun. 21, 2013

(65) Prior Publication Data

US 2013/0342486 A1      Dec. 26, 2013

Related U.S. Application Data

(60) Provisional application No. 61/663,419, filed on Jun. 22, 2012.

(51) Int. Cl.
| | |
|---|---|
| *G09G 5/00* | (2006.01) |
| *G06F 3/041* | (2006.01) |
| *G06F 3/0488* | (2013.01) |

(52) U.S. Cl.
CPC ............ *G06F 3/041* (2013.01); *G06F 3/04883* (2013.01)

(58) Field of Classification Search
USPC ................... 345/173, 156, 179; 705/3; 710/8
See application file for complete search history.

(56) References Cited

U.S. PATENT DOCUMENTS

| | | | |
|---|---|---|---|
| 5,448,263 | A | 9/1995 | Martin |
| 5,583,980 | A | 12/1996 | Anderson |
| 6,141,000 | A | 10/2000 | Martin |
| 6,337,681 | B1 | 1/2002 | Martin |
| 6,747,636 | B2 | 6/2004 | Martin |
| 6,803,906 | B1 | 10/2004 | Morrison et al. |
| 7,232,986 | B2 | 6/2007 | Worthington et al. |
| 7,236,162 | B2 | 6/2007 | Morrison et al. |
| 7,274,356 | B2 | 9/2007 | Ung et al. |
| 7,286,141 | B2 | 10/2007 | Rieffel et al. |
| 9,176,653 | B2 * | 11/2015 | Montague ........... G06F 3/04845 |
| 2005/0034083 | A1 * | 2/2005 | Jaeger ................. G06F 3/04847 |
| | | | 715/863 |
| 2008/0204476 | A1 * | 8/2008 | Montague ........... G06F 3/04845 |
| | | | 345/661 |
| 2012/0218203 | A1 * | 8/2012 | Kanki .................... G06F 3/0485 |
| | | | 345/173 |
| 2013/0019200 | A1 * | 1/2013 | Montague ........... G06F 3/04845 |
| | | | 715/800 |
| 2013/0054270 | A1 * | 2/2013 | Sparks et al. ..................... 705/3 |
| 2014/0317319 | A1 * | 10/2014 | Ichieda ............................. 710/8 |

\* cited by examiner

*Primary Examiner* — Thuy Pardo
(74) *Attorney, Agent, or Firm* — Perkins Coie LLP (57) ABSTRACT

A method of modifying an annotation input on an interactive display in an interactive input system is described. Reference pixel values in a region of interest of a reference frame are determined. The region of interest is associated with the annotation. The reference pixel values are stored in memory. It is determined whether current pixel values in the region of interest of a current frame differ from the reference pixel values. The annotation is faded if the current pixel values in the region of interest differ from the reference pixel values. A computing device configured to implement the method and a computer-readable medium having stored thereon instruction to implement the method are also described.

21 Claims, 11 Drawing Sheets

AUTOMATIC ANNOTATION DE-EMPHASIS

FIELD OF THE INVENTION

The present invention relates generally to interactive input systems, and in particular, to a system and method for automatically de-emphasizing annotations added to image data as the image data changes. This application claims priority from U.S. Provisional Application No. 61/663,419 filed Jun. 22, 2012.

BACKGROUND OF THE INVENTION

Interactive input systems that allow users to inject input (e.g., digital ink, mouse events etc.) into an application program using an active pointer (e.g., a pointer that emits light, sound, or other signal), a passive pointer (e.g., a finger, cylinder or other suitable object) or other suitable input devices such as for example, a mouse, or trackball, are known. These interactive input systems include but are not limited to: touch systems comprising touch panels employing analog resistive or machine vision technology to register pointer input such as those disclosed in U.S. Pat. Nos. 5,448,263; 6,141,000; 6,337,681; 6,747,636; 6,803,906; 7,232,986; 7,236,162; and 7,274,356, all assigned to SMART Technologies of ULC of Calgary, Alberta, Canada, assignee of the subject application, the disclosure of which is incorporated by reference; touch systems comprising touch panels employing electromagnetic, capacitive, acoustic or other technologies to register pointer input; tablet, laptop and desktop personal computers (PCs); personal digital assistants (PDAs) and other handheld devices; and other similar devices.

Above-incorporated U.S. Pat. No. 6,803,906 to Morrison et al. discloses a touch system that employs machine vision to detect pointer interaction with a touch surface on which a computer-generated image is presented. A rectangular bezel or frame surrounds the touch surface and supports digital imaging devices at its corners. The digital imaging devices have overlapping fields of view that encompass and look generally across the touch surface. The digital imaging devices acquire images looking across the touch surface from different vantages and generate image data. Image data acquired by the digital imaging devices is processed by on-board digital signal processors to determine if a pointer exists in the captured image data. When it is determined that a pointer exists in the captured image data, the digital signal processors convey pointer characteristic data to a master controller, which in turn processes the pointer characteristic data to determine the location of the pointer in (x,y) coordinates relative to the touch surface using triangulation. The pointer coordinates are conveyed to a computer executing one or more application programs. The computer uses the pointer coordinates to update the computer-generated image that is presented on the touch surface. Pointer contacts on the touch surface can therefore be recorded as writing or drawing or used to control execution of application programs executed by the computer.

Multi-touch interactive input systems that receive and process input from multiple pointers using machine vision are also known. One such type of multi-touch interactive input system exploits the well-known optical phenomenon of frustrated total internal reflection (FTIR). According to the general principles of FTIR, the total internal reflection (TIR) of light traveling through an optical waveguide is frustrated when an object such as a pointer touches the waveguide surface, due to a change in the index of refraction of the waveguide at the touch location, causing some light to escape from the touch point. The escaping light reflects off the object, passes through the waveguide and is captured in images acquired by the interactive input system. The captured images including the point(s) of escaped light, and processes the images to identify the position on the waveguide surface based on the point(s) of escaped light for use as input to application programs.

In many scenarios, interactive input systems are used during collaboration and brainstorming meetings. Such meetings may include participants that are present in a meeting room as well as the ones who join the meeting from remote locations. During brainstorming meetings, an effective way to bring across an idea is to annotate on the surface of the interactive input system which is displaying a document, picture, video or content related to the meeting. Accordingly, it is important that the annotations are managed properly.

U.S. Pat. No. 5,583,980 to Anderson discloses a method that enables an image to be displayed along with annotations in synchronization with separate, time-based program material as might be found in a computer-based multimedia system. The time-based program material may include audio or video information, or a combination of these, as in a digital movie with the annotated image and movie being accessed from a high-capacity storage means, such as a CD-ROM, and played in separate windows on the same display screen. The method provides smooth, real-time annotation of the on-screen image by synchronizing the movement of a pen image with very low flicker and with little overhead in terms of system performance and memory allocation. This improved performance stems from the inventive use of multiple off-screen buffers, and the processing of the previously stored annotations in the form of multiple data records including temporal and spatial information relating to the annotations as originally performed. The data records are processed during predetermined time periods, with image information being transferred into and out of these various off-screen buffers so as to facilitate real-time annotation in synchronization with the time-based program material.

U.S. Pat. No. 7,286,141 to Rieffel et al. discloses techniques for generating temporary digital ink on media. Marks or gestures are made using one or more temporary digital inks on media, such as a digital document. Digital ink may be dynamically determined to be permanent or temporary. Each mark or gesture using temporary digital inks may fade based on at least one condition. The conditions include a predetermined time determined based on, a first stroke of the temporary digital ink, completion of the temporary digital ink, appearance of the temporary digital ink to another user, a first stroke of a succeeding group of digital ink, and a stroke of the succeeding digital ink is completed. Conditions may also include changing display attributes, such as color and thickness of digital ink, and fading or switching in reaction to an audio or video signal.

While above-mentioned prior art systems and methods provide various approaches for users to present and interact with information presented on an interactive input system, limited functionality is available to automatically manage ink annotations. It is therefore an object of an aspect of the following to provide a novel annotation system and method.

SUMMARY OF THE INVENTION

In accordance with one aspect there is provided a method of modifying an annotation input on an interactive board in an interactive input system comprising the steps of: determining reference pixel values in a region of interest of a reference frame, the region of interest being associated with the annotation; storing the reference pixel values in memory; determining whether current pixel values in the region of interest of a current frame differ from the reference pixel values; and fading the annotation if the current pixel values in the region of interest differ from the reference pixel values.

In accordance with a further aspect there is provided a computing device configured to communicate with an interactive board in order to receive interactions, including annotations, therewith and display image frames thereon, the computing device including memory for storing instructions and a processor configured to execute the instructions to implement the steps of: determining reference pixel values in a region of interest of a reference image frame, the region of interest being associated with the annotation; storing the reference pixel values in memory; determining whether current pixel values in the region of interest of a current image frame differ from the reference pixel values; and fading the annotation if the current pixel values in the region of interest differ from the reference pixel values.

In accordance with yet a further aspect there is provided a non-transitory computing-readable medium having stored thereon instructions for communicating with an interactive board in order to receive interactions, including annotations, therewith and display image frames thereon, the instructions when executed by a processor cause the processor to implement the steps of: determining reference pixel values in a region of interest of a reference image frame, the region of interest being associated with the annotation; storing the reference pixel values in memory; determining whether current pixel values in the region of interest of a current image frame differ from the reference pixel values; and fading the annotation if the current pixel values in the region of interest differ from the reference pixel values.

In accordance with yet a further aspect there is provided a method of determining key frames input on an interactive board in an interactive input system, the interactive board configured to receive input, including annotations, thereon, the method comprising the steps of: determining reference pixel values in a region of interest of a reference frame, the region of interest being associated with the annotation; storing the reference pixel values in memory; determining whether current pixel values in the region of interest of a current frame differ from the reference pixel values; and determining whether previous pixel values in the region of interest of a previous frame differ from the reference pixel values; and identifying a key frame and storing the key frame in memory if the current pixel values differ from the reference pixel values and the previous pixel values do not differ from the reference pixel values.

BRIEF DESCRIPTION OF THE DRAWINGS

Embodiments will now be described by way of example only with reference to the following drawings in which.

DETAILED DESCRIPTION OF THE EMBODIMENTS

Figure 1:
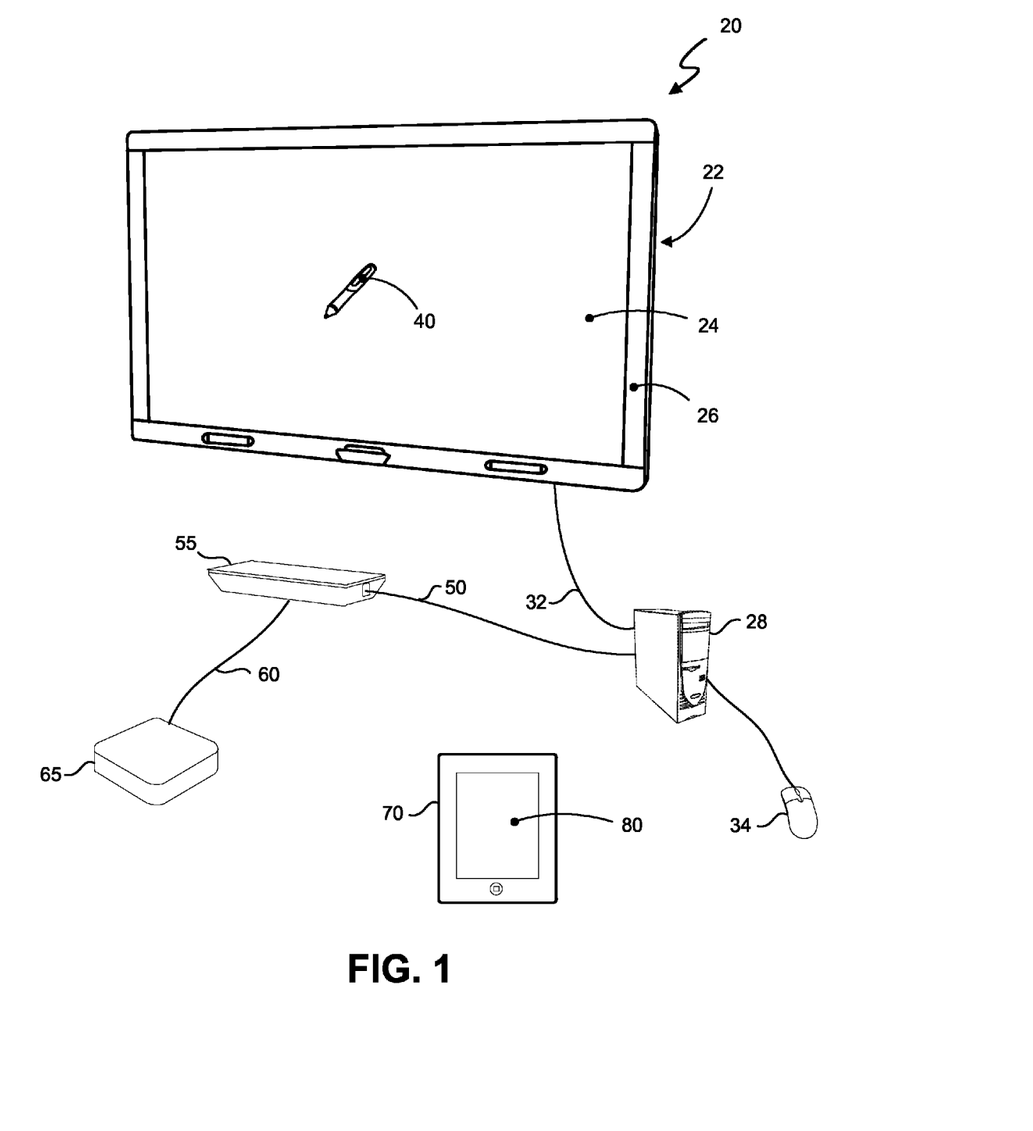
FIG. 1 is a perspective view of an interactive input system.

For ease of explanation, like numerals in the description refer to like structures in the drawings. Referring to FIG. 1, an interactive input system is generally identified by reference numeral 20. The interactive input system 20 comprises an interactive board 22, a computing device 28, a digital media receiver (DMR) 65, a frame grabber 55 and a source computer 70. The interactive input system 20 allows a user to inject input, such as digital ink, into an application program executed by the computing device 28.

In this embodiment, the interactive board 22 is mounted on a vertical support surface such as a wall surface or the like, or is otherwise supported or suspended in an upright position. The interactive board 22 comprises a generally planar, rectangular interactive surface 24 that is surrounded about its periphery by a bezel 26. Images, such as a computer desktop for example, are displayed on the interactive surface 24. In this embodiment, the interactive board 22 uses a liquid crystal display (LCD) panel to display the images.

The interactive board 22 employs imaging assemblies (not shown) to detect one or more pointers brought into a region of interest in proximity with the interactive surface 24. The interactive board 22 communicates via a first data cable 32 with the computing device 28, which executes one or more application programs. The first data cable 32 is one of a universal serial bus (USB) cable, FireWire® cable, Thunderbolt™ cable or the like. Alternatively, the interactive board 22 may communicate with the computing device 28 using wireless technology, such as Wi-Fi. The computing device 28 processes the output of the interactive board 22 and adjusts image data that is output to the interactive board 22, if required, so that the image presented on the interactive surface 24 reflects pointer activity. In this manner, the interactive board 22 and the computing device 28 allow pointer activity proximate to the interactive surface 24 to be recorded as annotations, such as writing or drawing, or actions used to control execution of one or more application programs executed by the computing device 28. The interactive input system 20 is able to detect passive pointers such as a user's finger, a cylinder or other suitable objects as well as passive and active pen tools 40 that are brought into proximity with the interactive surface 24 and within a field of view of the imaging assemblies. The user may also enter input or commands through a mouse 34 or a keyboard (not shown) attached to the computing device 28. Other input techniques such as voice or gesture-based commands may also be used to interact with the interactive input system 20.

The imaging assemblies are accommodated by the bezel 26, with each imaging assembly being positioned adjacent a different corner of the bezel. Each of the imaging assemblies comprises an image sensor and associated lens assembly that provides the image sensor with a field of view sufficiently large as to encompass the entire interactive surface 24. A digital signal processor (DSP) or other suitable processing device sends clock signals to the image sensor causing the image sensor to capture image frames at the desired frame rate.

The imaging assemblies are oriented so that their fields of view overlap and look generally across the entire interactive surface 24. In this manner, any pointer, pen or eraser tool that is brought into proximity of the interactive surface 24 appears in the fields of view of the imaging assemblies and thus, is captured in image frames acquired by multiple imaging assemblies. When the imaging assemblies acquire image frames in which a pointer exists, the imaging assemblies convey the image frames to a master controller (not shown). The master controller in turn processes the image frames to determine the position of the pointer in (x,y) coordinates relative to the interactive surface 24 using triangulation. The pointer coordinates are then conveyed to the computing device 28 which uses the pointer coordinates to update the image displayed on the LCD panel if appropriate. Pointer activity proximate to the interactive surface 24 can therefore be recorded as writing or drawing or used to control execution of application programs running on the computing device 28.

The computing device 28 in this embodiment is a personal computer comprising, for example, a processing unit, memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The first data cable 32 connects the computing device 28 to the interactive board 22 via the master controller. The computing device 28 may also be configured to connect to a network using wired technology such as Ethernet, wireless technology such as Wi-Fi, and/or other network technologies, to access shared or remote drives, one or more networked computers, or other networked devices.

The source computer 70 is present in close proximity to the interactive board 22. Similar to the computing device 28, the source computer 70 includes a processing unit and memory (not shown) as well as a user interface 80. The source computer 28 is also configured to connect to a network using wired technology such as Ethernet, wireless technology such as Wi-Fi, and/or other network technologies. In this embodiment, the source computer 70 is a tablet computer, or simply tablet and the user interface 80 is an interactive display surface. The tablet 70 provides source data such as documents, pictures and/or videos on the interactive display surface 80. The source data can be stored in the tablet's memory or streamed from a remote server (not shown) via the network. The tablet 70 is in communication with the DMR 65. In this embodiment, the tablet 70 and the DMR 65 communicate using a Wi-Fi connection. The DMR 65 is commonly referred to as a media extender, a digital media hub or a digital media adapter. In general terms, the DMR 65 is a device that can connect to a local network to retrieve digital media files (such as music, pictures, and videos) from one or more computing devices and/or networked media servers and make them available for presentation on a display, such as a television or projection system.

In this embodiment, the tablet 70 and the DMR 65 is an Apple® iPad® and an Apple TV®, respectively. The iPad® 70 communicates with the Apple TV® 65 via AirPlay®. AirPlay® is a protocol that facilitates wireless streaming of audio, video and images together with the related metadata between the iPad® 70 and the Apple TV® 65. Thus, when the iPad® 70 is connected to the Apple TV® 65 via Wi-Fi, a screen capture of content displayed on the display surface 80 of the iPad® can be encoded and sent to the Apple TV® 65 using the AirPlay® protocol. The Apple TV® 65 receives the encoded content wirelessly and decodes it based on the AirPlay® protocol. The Apple TV® 65 produces an HDMI video output of this decoded content.

The HDMI video output is sent via an HDMI cable 60 to the frame grabber 55. In this embodiment, the frame grabber 55 is an HDMI frame grabber. The frame grabber 55 is connected to the computing device 28 via a second data cable 50, such as a USB cable, FireWire® cable, Thunderbolt™ cable or the like. The frame grabber 55 appears as a video source to the computing device 28. The data received by the frame grabber 55 is converted to digital frames and sent to the computing device 28 via the second data cable 50 as a video stream. Alternatively, the frame grabber 55 may communicate with the computing device 28 using wireless technology, such as Wi-Fi. This content is displayed on the interactive surface 24 of the interactive board 22.

Figure 2:
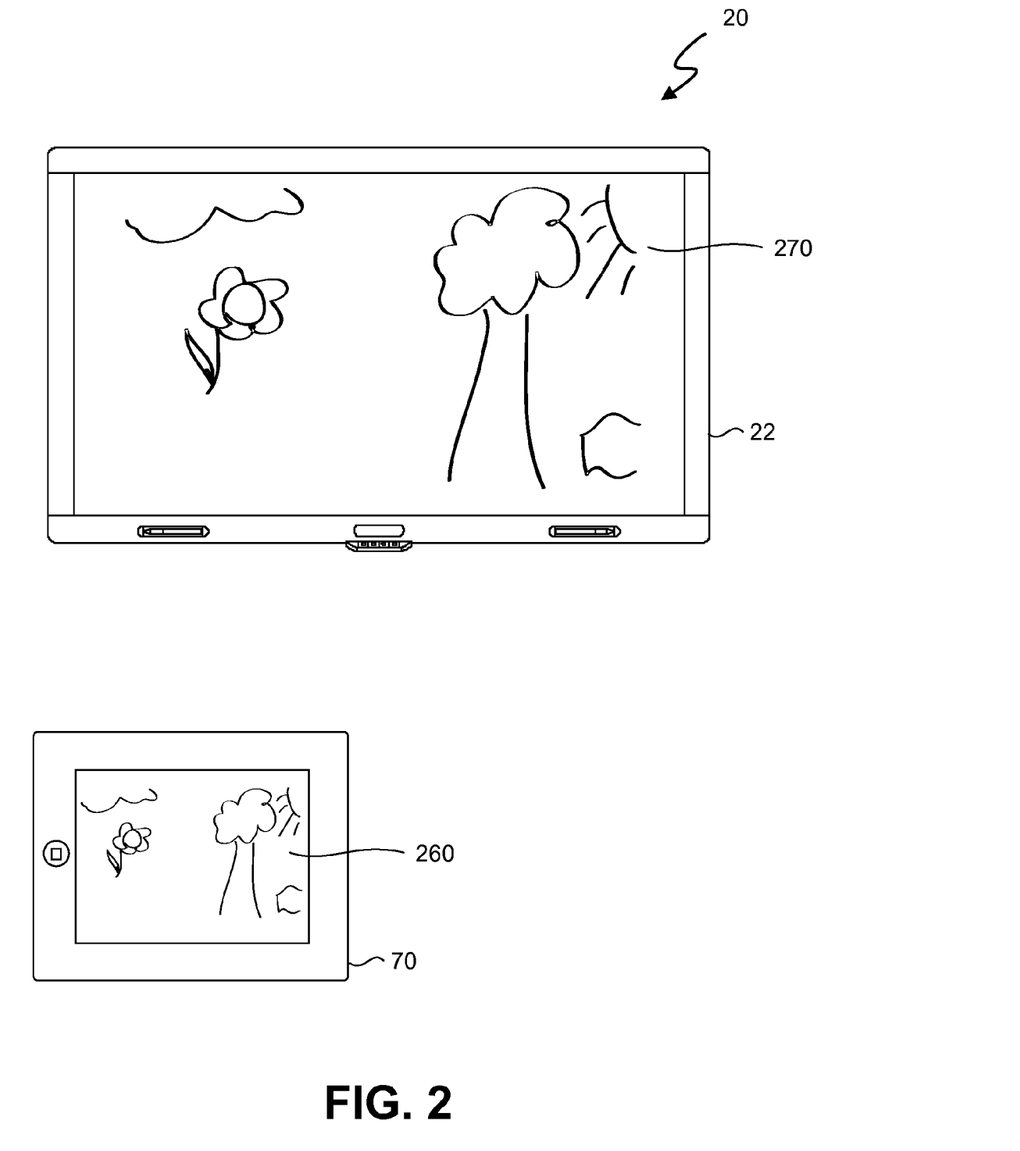
FIG. 2 shows an image on a tablet replicated on a display surface of the interactive input system of FIG. 1.

FIGS. 2 to 5 illustrate the interactive input system 20 when an image on the tablet 70 is displayed on the interactive surface 24 of the interactive board 22. For the sake of simplicity much of the hardware and connecting cables illustrated in FIG. 1 are not shown. Referring to FIG. 2, a display image 270 is displayed on the interactive board 22. The display image 270 is a replication of a source image 260 displayed on the tablet 70.

Figure 3:
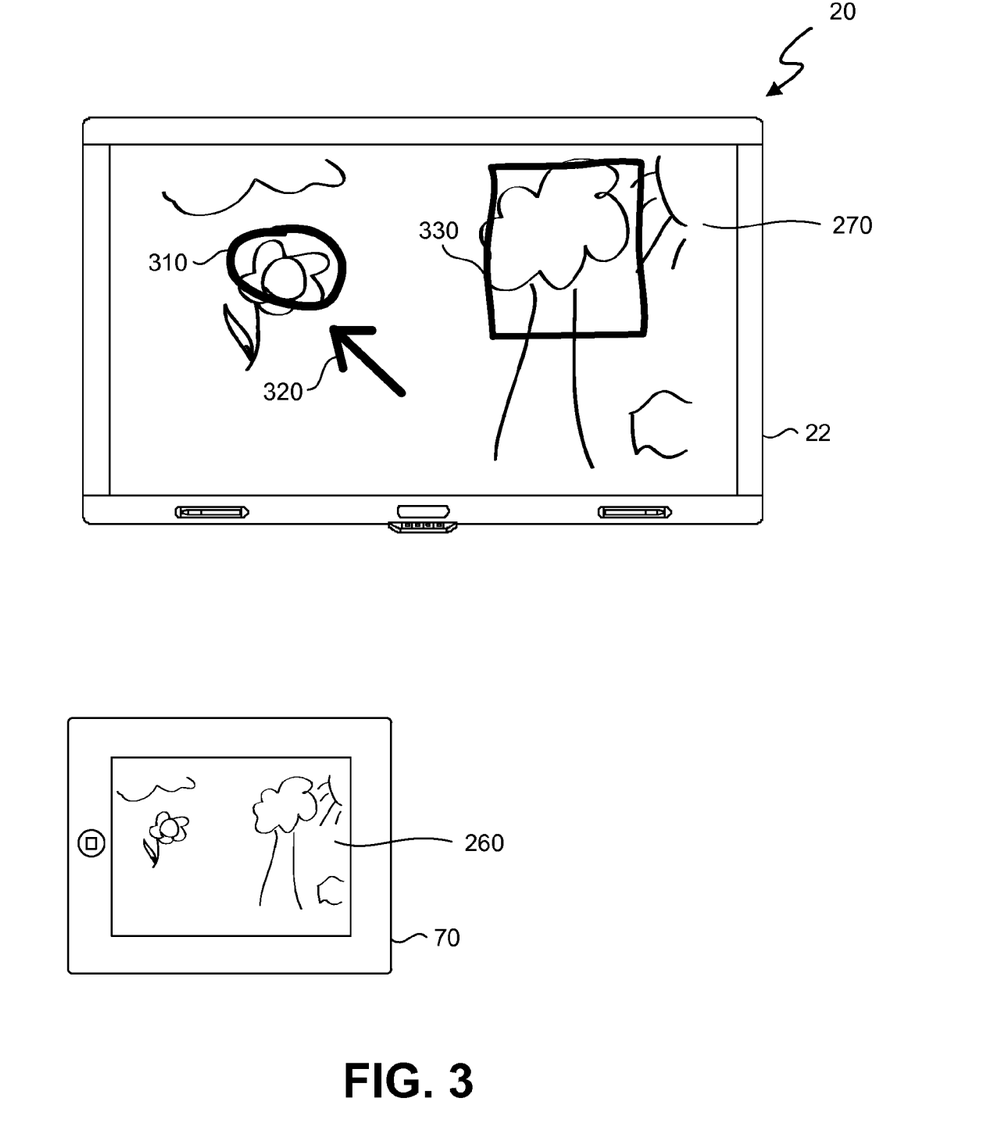
FIG. 3 shows annotations on the image displayed on the display surface of the interactive input system of FIG. 1.

Referring to FIG. 3, a user has made annotations 310, 320 and 330 on the display image 270 using the interactive board 22. The annotations are captured and recorded by the interactive user input system 20 as described above or using another known or proprietary annotation technology. Specifically, the user has made the annotations 310, 320 and 330 to highlight portions of the display image 270. For example, annotations 310 and 320 emphasize a portion of a flower in the display image 270 and annotation 330 emphasizes a portion of a tree in the display image 270. The annotations 310, 320 and 330 could be used for a number of different reasons including highlighting important points or concepts during a presentation, for example. In this embodiment, the annotations 310, 320 and 330 appear on the display image 270, but not on the source image 260.

Figure 4:
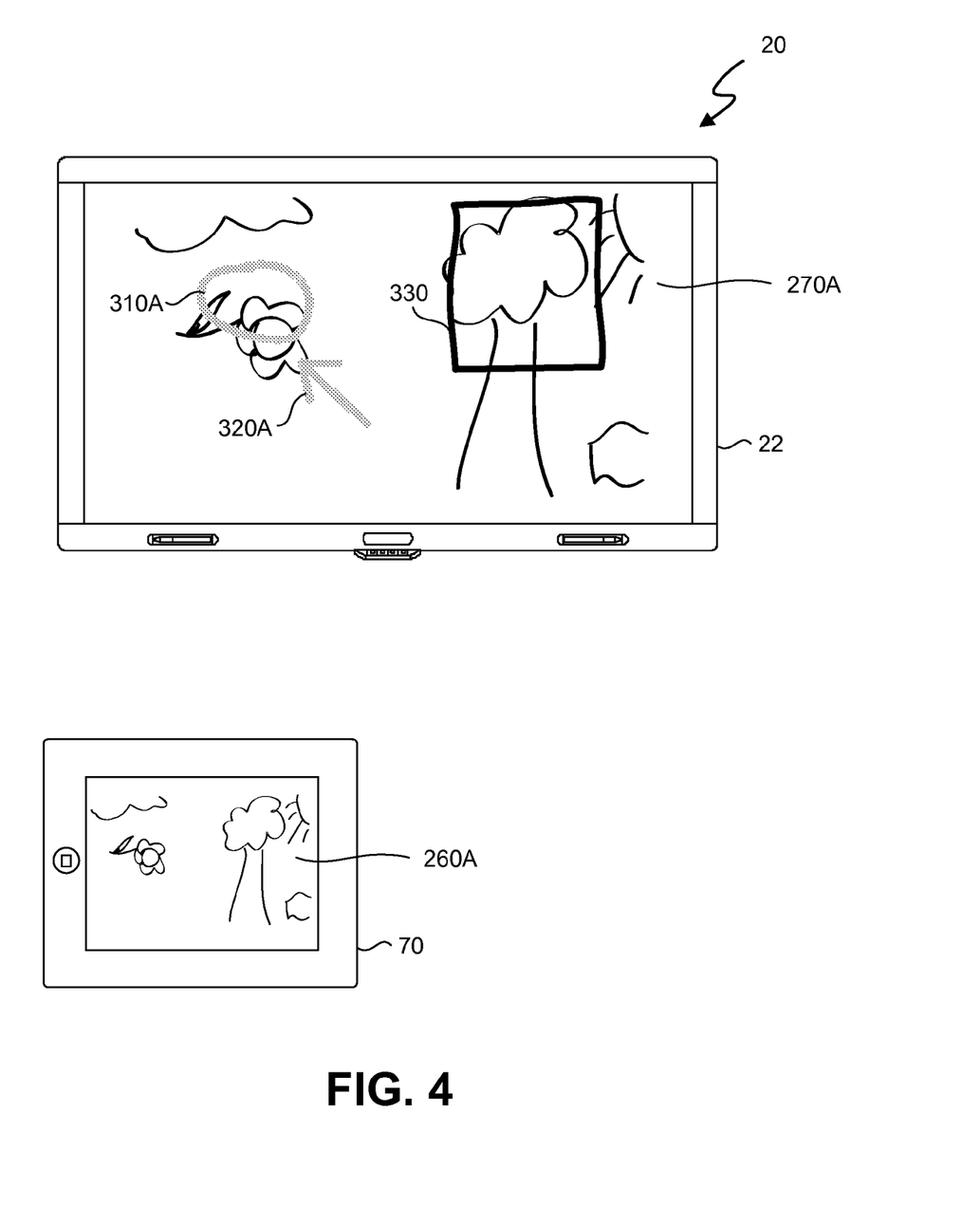
FIG. 4 shows a modified image on the display surface of the interactive input system of FIG. 1.

Referring to FIG. 4, the source image 260A has changed from the source image 260 shown in FIG. 3. Specifically, the flower in the source image 260 has rotated. This may occur, for example, if the source images 260 and 260A represent frames in a video of a falling flower. As described above, the display image 270A is updated to reflect the modified source image 260A. As illustrated in FIG. 4, the remainder of the source image 260A and the display image 270A are the same as the source image 260 and the display image 270 illustrated in FIG. 3. Thus it will be appreciated that the importance of the annotations 310 and 320 has degraded, since the image for which they were drawn has changed. That is, since the flower has been rotated, the annotations 310 and 320 created by the user do not reflect the portion of the flower initially annotated by the user. Since the annotations 310 and 320 no longer accurately reflect the context originally selected by the user, these annotations 310 and 320 are faded as illustrated by faded annotations 310A and 320A. The importance of the annotation 330 remains the same since the tree has not changed.

Figure 5:
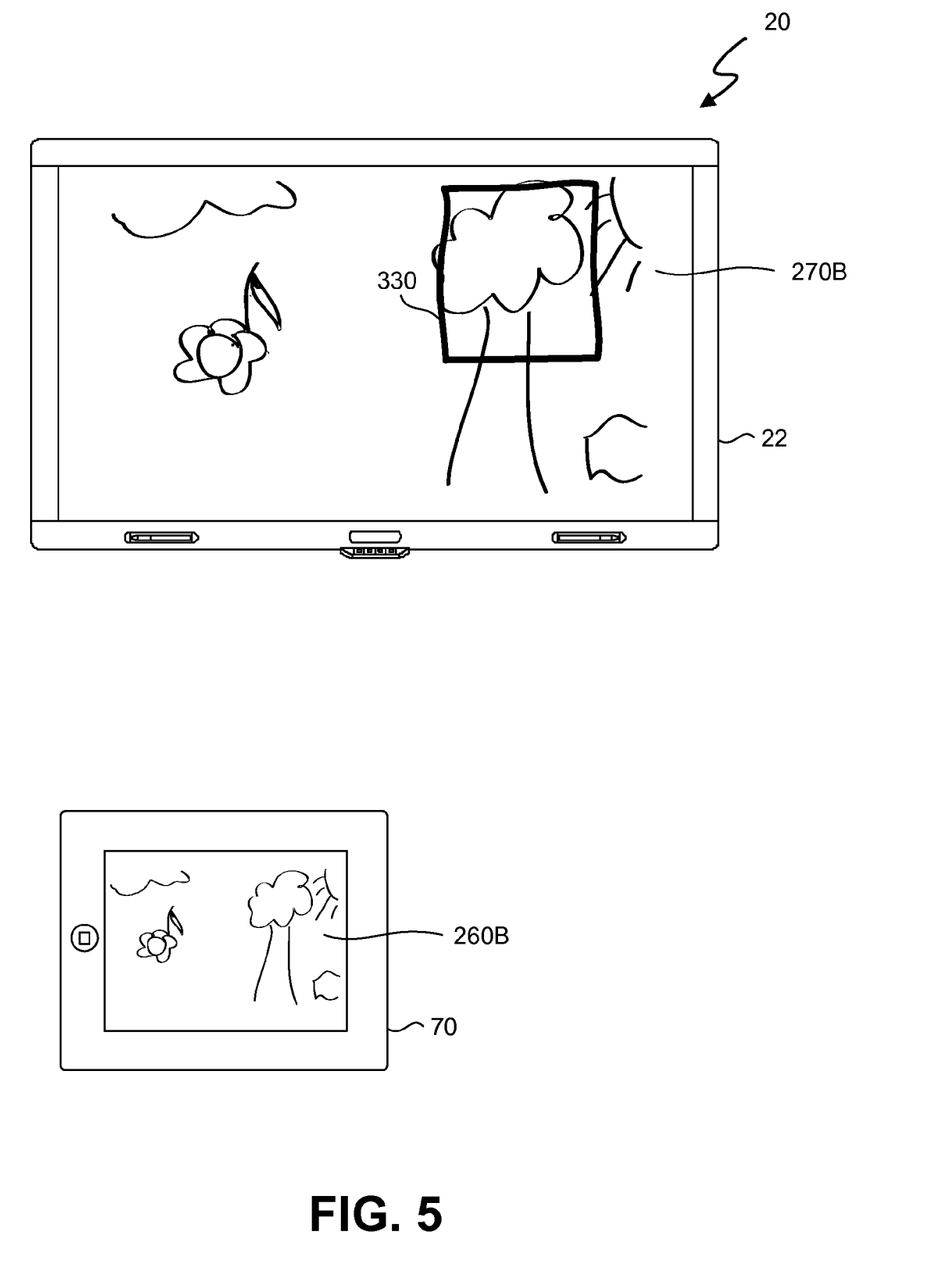
FIG. 5 shows a further modified image on the display surface of the interactive input system of FIG. 1.

Referring to FIG. 5, the source image 260B has further changed from the source image 260A shown in FIG. 4. Specifically, the flower in the source image 260A has rotated even further. As described above, the display image 270B is updated to reflect the modified source image 260B. As illustrated in FIG. 5, the remainder of the source image 260B and the display image 270B are the same as the source image 260 and the display image 270 illustrated in FIG. 3. At this point, the faded annotations 310A and 320A have been faded entirely from the display image 270B.

As will be described, in the present embodiment the computing device 28 determines how much of the image associated with each annotation has changed. As the image changes, the associated annotation is faded until the annotation is removed entirely.

Figure 6A:
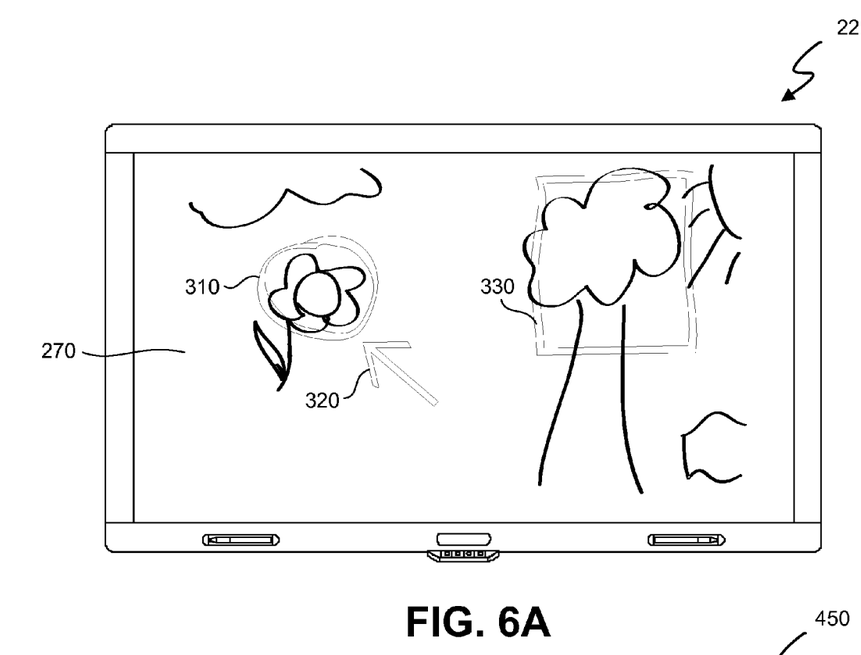
FIG. 6A shows the annotations in a transparent form over the image illustrated in FIG. 3.
Figure 6B:
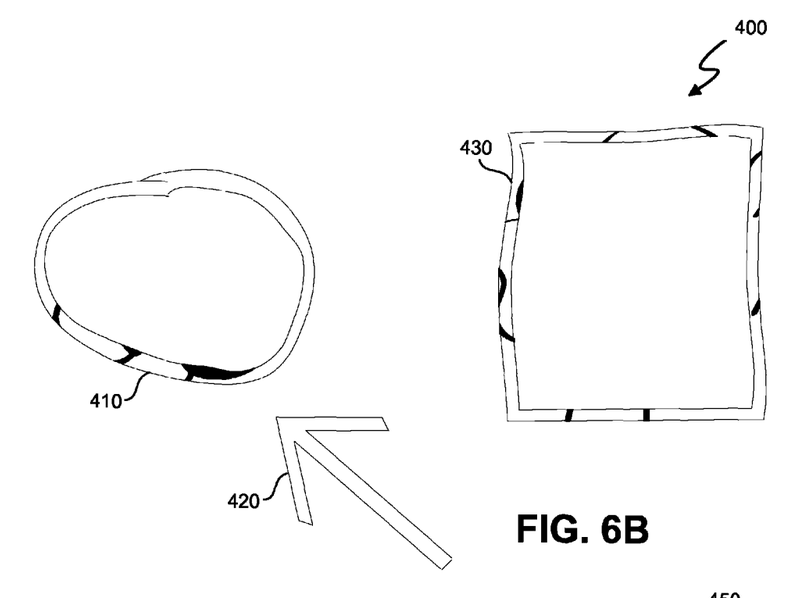
FIG. 6B shows an enlarged view of portions of the image covered by the annotations in FIG. 6A.

Referring to FIG. 6A, the interactive board 22 of FIG. 3 is shown. In FIG. 6a, the annotations 310, 320 and 330 are shown as transparent for illustrative purposes. That is, the portions of the display image 270 that would normally be covered by the annotations are visible. Pixel values in a region of interest are correlated with a corresponding annotation and stored. In this embodiment, each region of interest corresponds substantially to pixels representing portions of the display image 270 covered by the annotations 310, 320 and 330. Referring to FIG. 6B, an enlarged view of the regions of interest 410, 420 and 430 is shown generally by numeral 400.

Figure 7A:
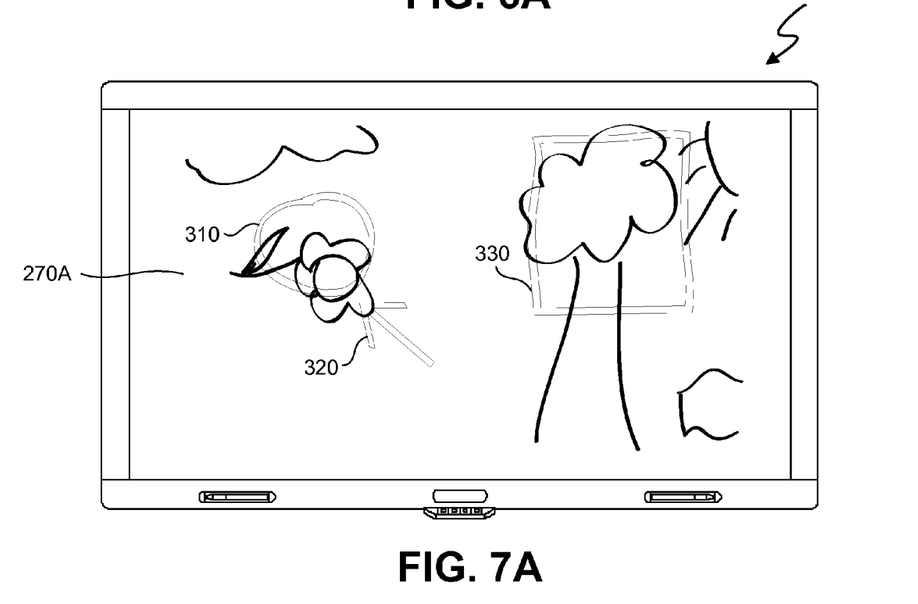
FIG. 7A shows the annotations in a transparent form over the image illustrated in FIG. 4.
Figure 7B:
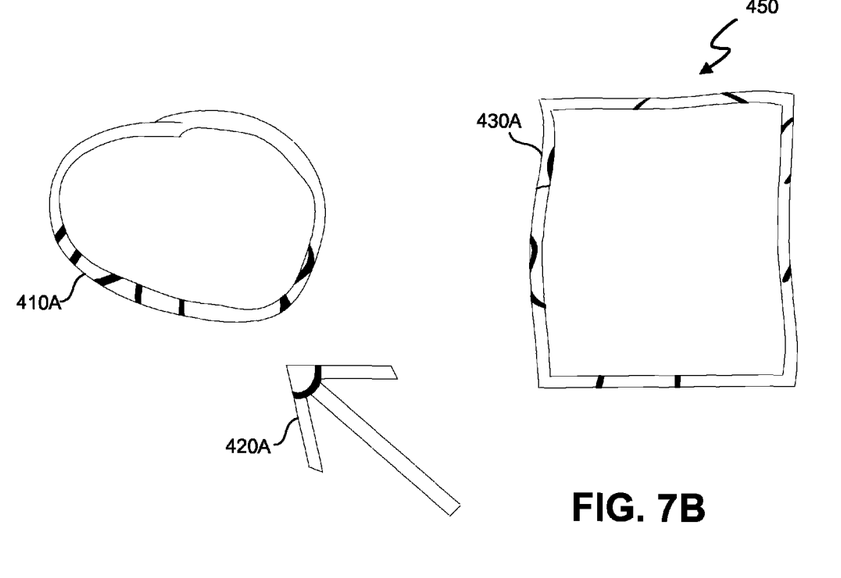
FIG. 7B shows an enlarged view of portions of the image covered by the annotations in FIG. 7A.

Referring to FIG. 7A, the interactive board 22 of FIG. 4 is shown. Similar to FIG. 6A, the annotations 310, 320 and 330 are shown as transparent for illustrative purposes. Referring to FIG. 7B, an enlarged view of the regions of interest 410A, 420A and 430A is shown generally by numeral 450.

Pixel values in each region of interest are compared with the pixel values of a corresponding stored region of interest. As will be described, the pixels in the stored region of interest represent pixels of the image displayed when the annotations were made. Thus, in this example, the regions of interest 410, 420 and 430 illustrated in FIG. 6B are the stored regions of interest. Further, as can be seen by comparing the examples shown in FIGS. 6B and 7B, the pixel values for the regions of interest 410A and 420A associated with the flower differ from the stored regions of interest 410 and 420 associated with the flower. Therefore, it can be concluded that the context for the annotations 310 and 320 associated with the flower is changing and they can be faded accordingly. Conversely, since the regions of interest associated with the tree remain the same, it can be concluded that the context for the annotation 330 associated with the tree is not changing. Thus, the annotation 330 associated with the tree is not faded.

In this embodiment, a fade rate is determined based on a comparison between the stored pixels values in the region of interest and current pixel values in the region of interest. The annotation is faded at the fade rate, which can be increased or stopped altogether, depending on the content of the images. For example, if the pixel values in the region of interest continue to change for subsequent images, the fade rate for a corresponding annotation may increase. Alternatively, once the fade rate is determined it may not be recalculated. If the pixel values in the region of interest return to the stored values, then the fade rate may drop to zero so that the annotation stops fading. Alternatively, if the pixel values in the region of interest return to the stored values the fade rate may be reversed allowing the annotation to be restored to its original state. The reversal of the annotation to its original state may be gradual or immediate.

In an alternative embodiment, rather than a fade rate, the annotations are faded based on a comparison between the stored pixels values in the regions of interest and current pixel values in the regions of interest for each image. For each annotation, the greater the difference between the current pixel values and the stored pixel values, the greater the degree of fading. If the difference reaches a threshold level then the annotations are removed altogether. In this manner, if there is a change in the source data that causes the annotation to fade, the annotation can be restored if the change in the source data is corrected. Alternatively, fading of the annotation may be stopped if the image stops changing or the image returns to its original state. In this manner, the annotation may not be restored to its original state.

The following exemplifies the difference between a fade amount and a fade rate. Consider a case in which there is a ten percent change of the pixel value in the region of interest from a first image to a second image and no change from the second image to a third image. If fading of the annotation is based on a fade amount then the annotation in the second and third image will appear the same. That is, the difference between the first and second image is the same as the difference between the first image and third image. If fading of the annotation is based on a fade rate then the annotation in the third image will appear more faded than the annotation in the second image. That is, even though the fade rate remains the same, because the third image appears at a later time than the second image, the annotation will have faded further.

The description above refers to changes in the display image 270 as a result of changes in the source image 260. In an alternative embodiment, the changes in the display image 270 may occur as a result of user interaction with the interactive board 22. Thus, for example, the flower in the display image 270 can be modified by a user selecting the flower at the interactive board 22 and rotating or moving it. Such a modification will cause the associated annotation or annotations to fade, as described above. In this case the source image 260 will not change on the display 80 of the tablet 70.

In order to implement the fading as described above, fading software in program code is provided on the computing device 28. The fading software may be standalone software, incorporated into existing annotation software, provided as a plug-in to existing annotation software or the like. The fading software is configured to implement steps necessary to fade the annotation as described above.

Figure 8:
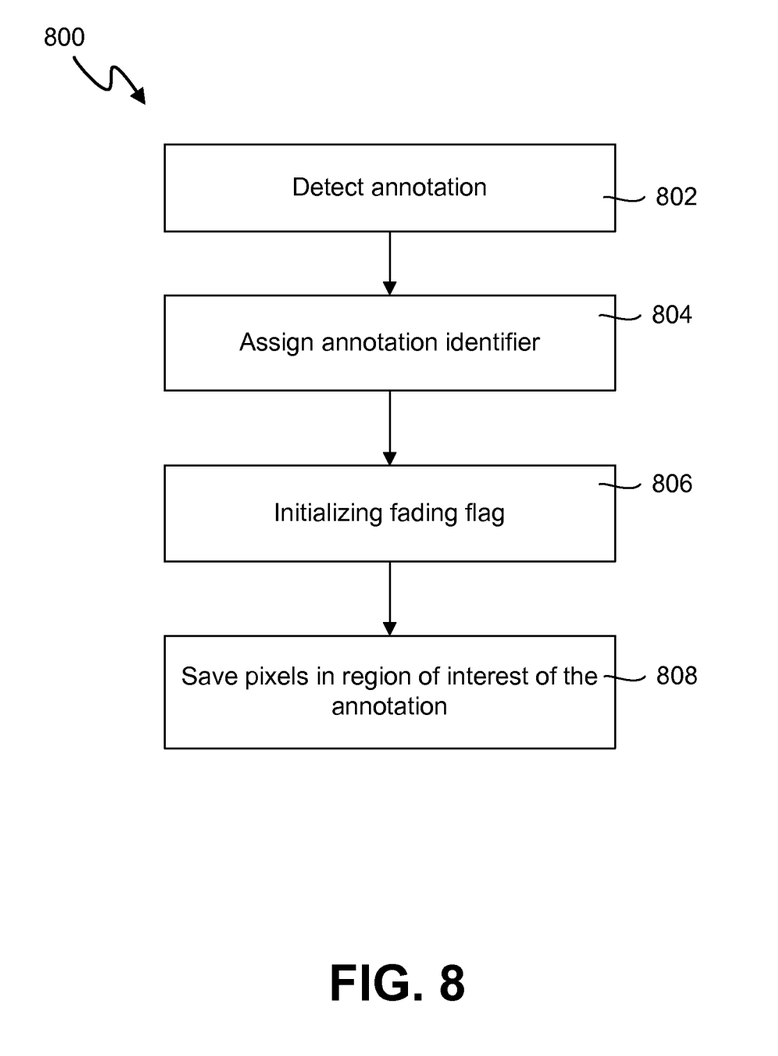
FIG. 8 is a flowchart illustrating steps performed when a new annotation is added.

Referring to FIG. 8, a flow chart illustrating steps taken by the fading software upon detection of an annotation on the interactive board 22 is illustrated generally by numeral 800. These steps are taken for each annotation. At step 802, an annotation on the interactive board 22 is detected. At step 804, an annotation identifier is assigned to the annotation. At step 806, a fading flag is initiated as false. The fading flag is used to identify whether the annotation is fading. At step 808, the pixel values of the pixels located in the region of interest associated with the annotation are stored in the memory of the computing device 28 as an initial frame. As previously described, in this embodiment the region of interest is the portion of the image that is covered by the annotation.

Figure 9:
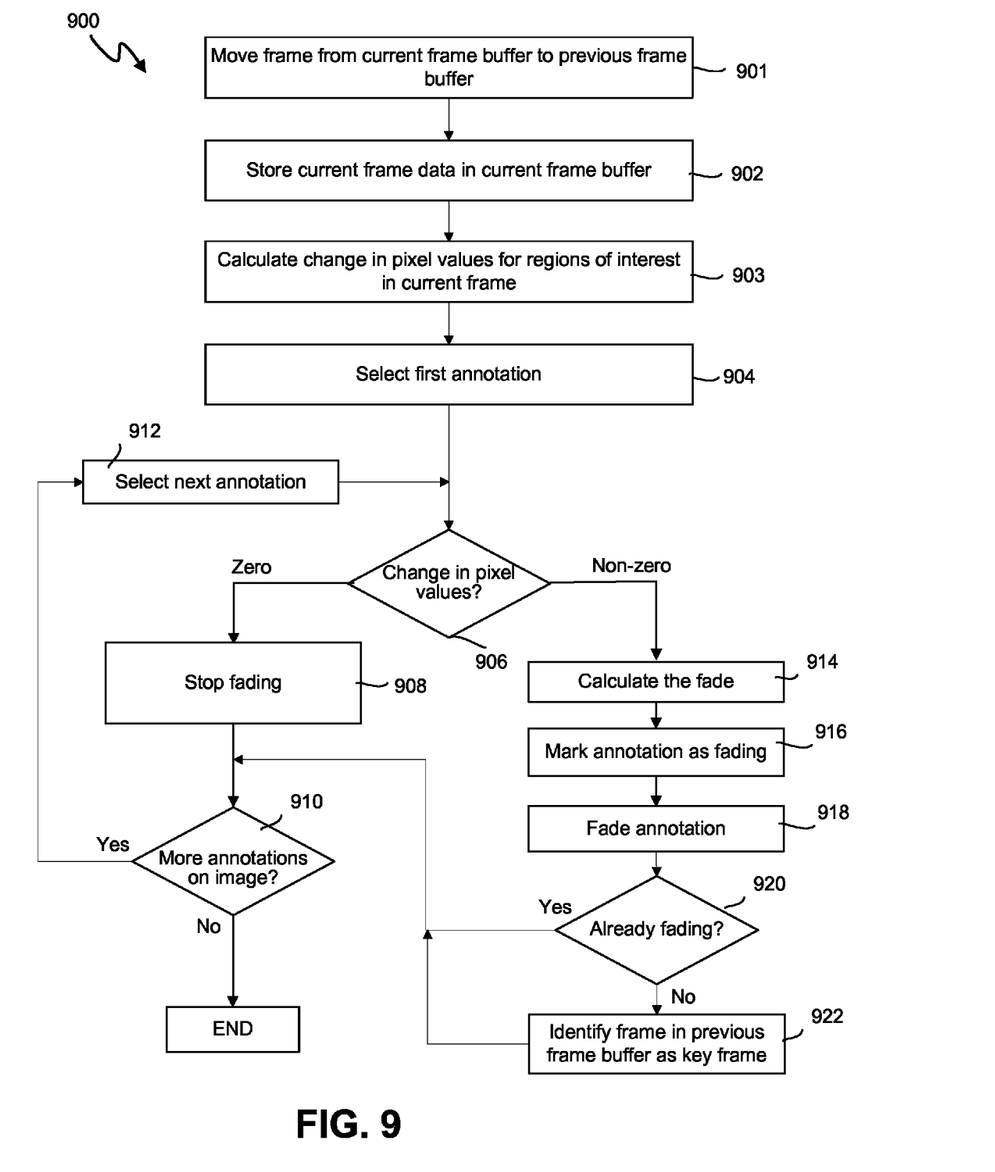
FIG. 9 is a flowchart illustrating steps for determining fading of the annotation.

Referring to FIG. 9, a flow chart illustrating steps taken by the fading software for each new image received from the source computer 70 is illustrated generally by numeral 900. In this embodiment, if the images represent frames in a video stream, then the steps illustrated in FIG. 9 are performed for each frame in the video stream. At step 901, a previously analyzed frame, if any, is moved to a previous frame buffer. At step 902, the frame to be analyzed is stored in a current frame buffer. At step 903, a change of pixel values in the regions of interest for each of the annotations in the frame is calculated. The changes are calculated based on a comparison of the regions of interest of the frame in the current frame buffer and the regions of interest stored in memory at step 808 of FIG. 8.

At step 904, a first annotation is selected. At step 906, it is determined if the change of pixel values in the corresponding region of interest, calculated in step 902, is zero or non-zero. That is, it is determined if there was a detected change of pixel values in the corresponding region of interest. If no change was calculated, then at step 908 the fading, if any, is stopped. For example, the fading flag is checked to see if the annotation is fading. If the annotation flag is false, it remains false. If the annotation flag is true, it is set to false. At step 910, it is determined if there are any further annotations in the image. If there are further annotations, then at step 912 a subsequent annotation is selected and the operation returns to step 906. If there are no further annotations, then the operation is complete.

Returning to step 906, if it is determined that a change of pixel values in the corresponding region of interest was calculated, then at step 914 fading of the annotation is determined. As previously described, the fading may comprise a fade amount or a fade rate. At step 916, the annotation is marked as fading. That is, if the fading flag is false it is set to true. At step 918, the annotation is faded as determined at step 914.

Optionally, it may be desirable to automatically determine and capture key frames. In this embodiment, a key frame refers to a frame prior to a frame in which a change in the region of interest is detected. Said another way, the key frame is the frame prior to the frame in which an annotation first begins to fade. Automatically determining and capturing key frames allows users to revisit previously annotated images after the image content has changed, without requiring the user to remember to capture the frames at the time.

Thus, once the annotation is faded at step 918, the operation continues at step 920 and it is determined whether or not the annotation was already fading. This is known from step 916 in which the fading flag is set. If the fading flag had to be changed from false to true, then the annotation was not already fading. If the fading flag was already true, then the annotation was already fading. If the annotation was already fading, then the operation continues at step 910 and it is determined if there are any further annotations. If, however, the annotation was not already fading, then the operation continues at step 922. At step 922, the frame in the prior frame buffer is stored in memory as a key frame. In this embodiment, the key frame is stored along with a frame identifier, a timestamp and annotation data.

Optionally, before saving a frame as a key frame, the frame is compared with previously saved key frames. If the frame matches one of the previously saved key frames, it is not saved as a key frame. This feature will reduce duplicate key frames from being stored in the memory, which will save storage space and make searching key frames more efficient.

Once the key frames have been determined, the operation continues at step 910 and it is determined if there are any further annotations in the frame. Accordingly, as described above, annotations made in an image can be automatically faded as the context to which the annotations relate changes.

The key frames can be made accessible to the user in a number of different manners. For example, all the key frames can be displayed on the interactive surface 24 of the interactive board 22. The frames can be arranged horizontally at a top or bottom portion of the interactive surface 24 of the interactive board 22 or vertically at a side portion of the interactive surface 24 of the interactive board 22. The key frames can be arranged in a sequential manner according to a time at which they were saved. If there are more key frames than the space available on the interactive board 22, a slider can be provided to scroll the key frames in forward or backward direction.

As another example, the user can search for the key frame which matches a selected region of the current image frame displayed on the interactive board 22. In this example, the user will select a portion of the current image or the entire image frame and give a command to the interactive input system 20 to search the stored key frames. The interactive input system 20 will match the image pixels of the selected image to the stored key frames. The key frame whose image pixels will match the selected image in the current image frame will be displayed to the user. Using this feature, the user can quickly search the key frame database for an image or a portion of an image.

Figure 10:
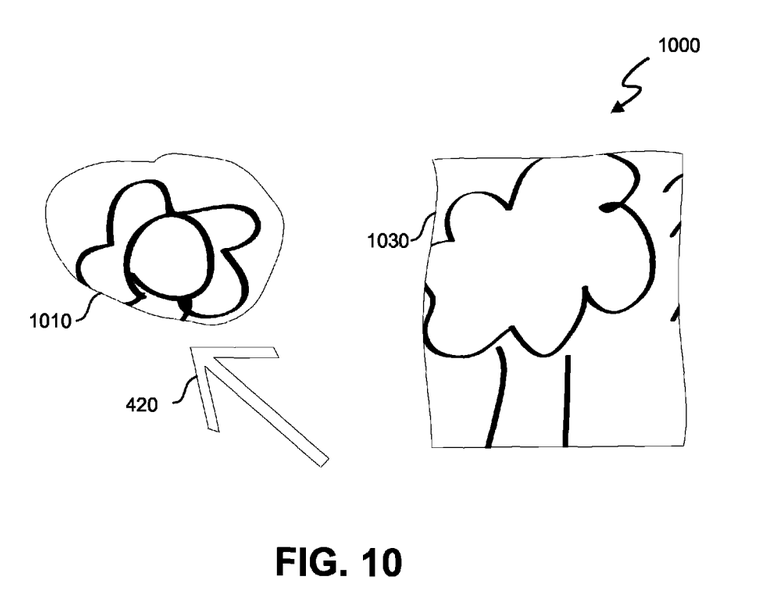
FIG. 10 shows a region of interest in accordance with an alternative embodiment.

As described above, the region of interest for each annotation represents the pixels substantially covered by the annotations themselves. However, in other embodiments the regions of interest may vary. In an alternative embodiment, the region of interest is expanded to cover an area defined by the annotation if the annotation is closed or substantially closed so that an enclosed area can be extrapolated. Referring once again to the example illustrated in FIG. 3, two enclosed annotations 310 and 330 are shown. Referring to FIG. 10, an enlarged view of the regions of interest 1010, 420 and 1030 in accordance with this embodiment is shown generally by numeral 1000. As can be seen, the region of interest 1010 includes all of the area contained within the annotation 310 associated with the flower and the region of interest 1030 includes all of the area contained within the annotation 330 associated with the tree.

Figure 11:
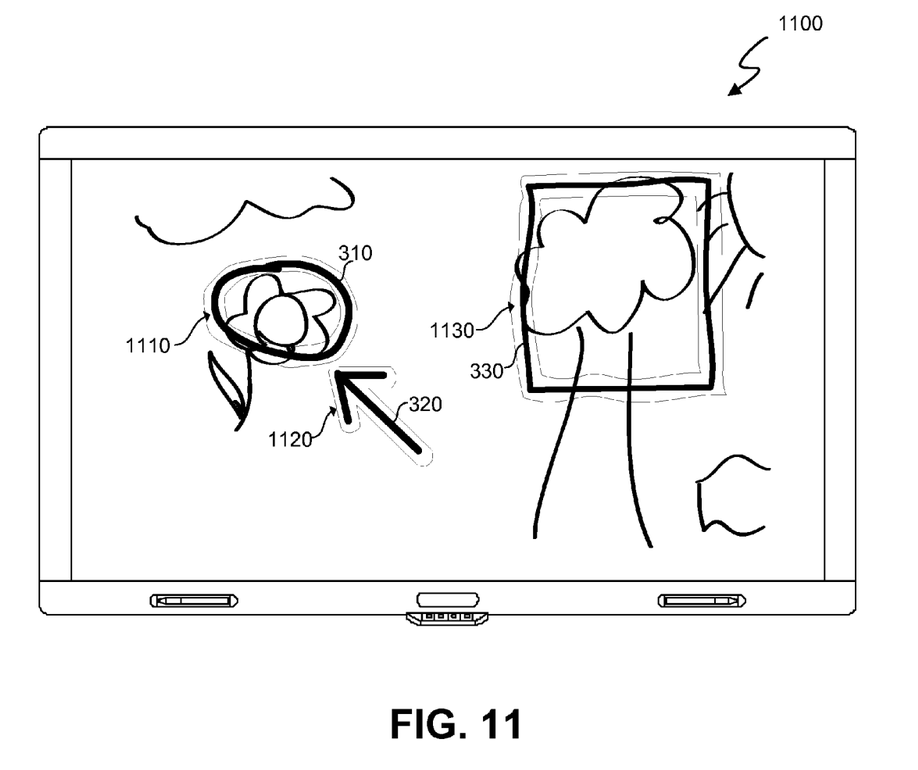
FIG. 11 shows a region of interest in accordance with yet an alternative embodiment.

In an alternative, the region of interest is expanded to include pixels about the annotation that would not necessarily be covered by the annotation itself. How far the region of interest is expanded beyond the pixels covered by the annotation will depend on the implementation. Referring to FIG. 11, an example of expanded regions of interest 1110, 1120 and 1130 is illustrated generally by numeral 1100. As is shown, the expanded regions of interest 1110, 1120 and 1130 include more pixels than those substantially covered by the annotations 310, 320 and 330.

As described above with reference to FIG. 9, the steps were performed for each frame in a video. In an alternative embodiment, it may not be necessary to perform the steps for each frame, but rather for each $n^{th}$ frame. The frequency at which to perform the steps described with reference to FIG. 9 may vary depending on the implementation and consideration of variables such as the frame rate of the video and processing power of the computing device 28, for example.

As described above, the source computer 70 is in close proximity to the interactive board 22. However, that need not be the case and in an alternative embodiment, the source computer 70 is located remote from the interactive board 22. In this embodiment, the DMR 65 and the frame grabber 55 can be located proximate to either the source computer 70 or the computing device 28, all of which are connected via the network, as will be appreciated by a person of ordinary skill in the art. Moreover, the source computer 70 and computing device 28 may be one and the same, and the DMR 65 and the frame grabber 55 may not be required at all As described above with reference to FIG. 8, the fading of each annotation is determined by comparing the pixels values in a region of interest of a current frame with the pixel values in the region of interest of the initial frame stored in memory. Thus, for each annotation, there is a common reference frame for all subsequent frames with which to compare. In an alternative embodiment, the fading of the annotation is determined by comparing the pixel values in a region of interest of a current frame with the pixel values in the region of interest stored in memory from a previous frame. Thus, the reference frame used to determine fading may differ for subsequent frames.

The interactive input system 20 is described above with reference to machine vision for ease of explanation only.

Other interactive systems, such as resistive systems, capacitive systems, infrared systems, waveguide systems and like may also be implemented. Moreover, different types of panels can be used for the interactive board and different implementations of machine vision systems can be used to detect user input.

Using the foregoing specification, the embodiments may be implemented as a machine, process or article of manufacture by using standard programming and/or engineering techniques to produce programming software, firmware, hardware or any combination thereof. Any resulting programs, having computer-readable instructions, may be embodied within one or more computer-usable media such as memory devices, thereby making a computer program product or article of manufacture according to the invention. As such, the term "software" as used herein is intended to encompass a computer program existent (permanently, temporarily, or transitorily) on any computer-usable medium.

Although embodiments have been described above with reference to the accompanying drawings, those of skill in the art will appreciate that variations and modifications may be made without departing from the scope thereof as defined by the appended claims.

What is claimed is:

1. A method of modifying an annotation input on an interactive display in an interactive input system comprising:
    determining a region of interest about the annotation;
    determining reference pixel values in the region of interest of a reference frame;
    storing the reference pixel values in memory;
    determining current pixel values in the region of interest of a current frame;
    determining whether the current pixel values differ from the reference pixel values; and
    fading the annotation when it is determined that the current pixel values differ from the reference pixel values.

2. The method of claim 1 wherein the fading of the annotation is based on a fade amount, the fade amount being determined by percentage change between the current pixel values and the reference pixel values in the region of interest.

3. The method of claim 2, wherein the fade amount does not decrease, even if the percentage change decreases.

4. The method of claim 1, wherein the annotation is removed from display on the interactive board once the percentage change passes a threshold level.

5. The method of claim 1 wherein the fading of the annotation is based on a fade rate, the fade rate being determined by a percentage change between the current pixel values and the reference pixel values in the region of interest.

6. The method of claim 5, wherein the fading of the annotation is stopped if the percentage change between the current pixel values and the reference pixel values in the region of interest decreases.

7. The method of claim 5, wherein the fading of the annotation is stopped only if the current pixel values return to the reference pixel values in the region of interest.

8. The method of claim 1, wherein the annotation is restored to its original form if the current pixel values return to the reference pixel values in the region of interest.

9. The method of claim 1, wherein the region of interest includes pixels that are substantially covered by the annotation.

10. The method of claim 9, wherein the region of interest further includes pixels beyond the pixels covered by the annotation.

11. The method of claim 10, wherein the region of interest further includes pixels in an area defined by the annotation if the annotation is closed or substantially closed.

12. The method of claim 1 further comprising:
    determining if the annotation is already fading; and
    if not, identifying a key frame and storing the key frame in memory.

13. The method of claim 12, wherein the key frame is a frame immediately prior to the frame in which the annotation is to be faded.

14. The method of claim 12, further comprising the step of comparing the key frame with previously stored key frames, and only storing the key frame in memory if no duplicate key frame is found.

15. The method of claim 1, wherein the current pixel values in the region of interest differ from the reference pixel values in response to a change in a source image to be displayed on the interactive board.

16. The method of claim 1, wherein the current pixel values in the region of interest differ from the reference pixel values in response to user input at the interactive board.

17. A computing device configured to communicate with an interactive display in order to receive interactions, including annotations, therewith and present image frames thereon, the computing device including memory for storing instructions and a processor configured to execute the instructions to execute the instructions to implement the steps of:
    determining a region of interest about the annotation;
    determining reference pixel values in the region of interest of a reference image frame;
    storing the reference pixel values in memory;
    determining current pixel values in the region of interest of a current image frame;
    determining whether the current pixel values differ from the reference pixel values; and
    fading the annotation when it is determined that the current pixel values differ from the reference pixel values.

18. A non-transitory computing-readable medium having stored thereon instructions for communicating with an interactive board in order to receive interactions, including annotations, therewith and display image frames thereon, the instructions when executed by a processor cause the processor to implement the steps of:
    determining a region of interest about the annotation;
    determining reference pixel values in the region of interest of a reference image frame;
    storing the reference pixel values in memory;
    determining current pixel values in the region of interest of a current image frame;
    determining whether the current pixel values differ from the reference pixel values; and
    fading the annotation when it is determined that the current pixel values differ from the reference pixel values.

19. A method of determining key frames displayed on an interactive display in an interactive input system, the interactive display configured to receive input, including annotations, thereon, the method comprising:
    determining a region of interest about the annotation;
    determining reference pixel values in the region of interest of a reference frame;
    storing the reference pixel values in memory;
    determining current pixel values in the region of interest of a current frame;
    determining whether the current pixel values differ from the reference pixel values;

determining whether previous pixel values in the region of interest of a previous frame differ from the reference pixel values; and identifying a key frame and storing the key frame in memory when it is determined that the current pixel values differ from the reference pixel values and the previous pixel values do not differ from the reference pixel values.

20. The method of claim 19, wherein the key frame is a frame immediately prior to the frame in which the key frame was identified.

21. A method comprising:

displaying at least one annotation input received at an interactive display in an interactive input system, the annotation encompassing a region of interest in a reference frame;

determining reference pixel values in the region of interest;

storing the reference pixel values in memory;

determining whether current pixel values in the region of interest of a current frame differ from the reference pixel values; and fading the display of the annotation when it is determined that the current pixel values in the region of interest differ from the reference pixel values.

* * * * *